United States Patent
Barois et al.

(10) Patent No.: US 12,015,453 B2
(45) Date of Patent: Jun. 18, 2024

(54) METHOD AND DEVICE FOR TRANSMITTING A MESSAGE

(71) Applicant: SAGEMCOM ENERGY & TELECOM SAS, Rueil Malmaison (FR)

(72) Inventors: Jérôme Barois, Rueil Malmaison (FR); Clément Terrien, Rueil Malmaison (FR)

(73) Assignee: SAGEMCOM ENERGY & TELECOM SAS, Bois-Colombes (FR)

(*) Notice: Subject to any disclaimer, the term of this patent is extended or adjusted under 35 U.S.C. 154(b) by 159 days.

(21) Appl. No.: 17/360,442

(22) Filed: Jun. 28, 2021

(65) Prior Publication Data
US 2022/0006488 A1    Jan. 6, 2022

(30) Foreign Application Priority Data

Jul. 1, 2020   (FR) ...................................... 2006934

(51) Int. Cl.
| H04B 3/54 | (2006.01) |
| H04B 1/00 | (2006.01) |
| H04B 1/7156 | (2011.01) |
| H04B 3/38 | (2006.01) |

(52) U.S. Cl.
CPC ........... H04B 3/542 (2013.01); H04B 1/0075 (2013.01); H04B 1/7156 (2013.01); H04B 3/38 (2013.01)

(58) Field of Classification Search
CPC .... H04B 3/542; H04B 1/0075; H04B 1/7156; H04B 3/38; H04B 3/54
USPC ........................................ 375/240, 260, 295
See application file for complete search history.

(56) References Cited

U.S. PATENT DOCUMENTS

| 4,071,707 A * | 1/1978 | Graf ....................... H04B 1/662 380/38 |
| 9,413,423 B1 * | 8/2016 | Pande ....................... H04L 1/20 |
| 2003/0226089 A1 * | 12/2003 | Rasmussen ........ H04N 21/2389 375/E7.021 |
| 2008/0159220 A1 * | 7/2008 | Kitchin ................. H04W 72/23 370/329 |
| 2008/0192719 A1 * | 8/2008 | So ....................... H04W 12/037 370/343 |

(Continued)

FOREIGN PATENT DOCUMENTS

EP     3104569 A1    12/2016

OTHER PUBLICATIONS

Feb. 10, 2021 Search Report issued in French Patent Application No. 2006934.

*Primary Examiner* — Emmanuel Bayard
(74) *Attorney, Agent, or Firm* — Williams Mullen; R. Brian Drozd

(57) ABSTRACT

A method for transmitting a message from a first node device to a second node device in which the second node device belongs to network neighborhood of the first node device. The first and second node devices belong to an electrical supply network using powerline communications. The first node device begins by fragmenting the message into at least a first fragment and a second fragment. Next it associates a first frequency band of a set of frequency bands with the first fragment and a second frequency band with the second fragment, the first and second frequency bands being different. It then transmits each first and second fragment on the frequency band with which it is associated.

7 Claims, 4 Drawing Sheets

(56) References Cited

U.S. PATENT DOCUMENTS

| | | | |
|---|---|---|---|
| 2010/0128651 A1* | 5/2010 | Yim | H04B 7/15592 |
| | | | 370/315 |
| 2012/0134395 A1 | 5/2012 | Varadarajan et al. | |
| 2013/0013731 A1* | 1/2013 | Ree | H04L 67/125 |
| | | | 709/217 |
| 2013/0182719 A1 | 7/2013 | Vedantham et al. | |
| 2019/0288954 A1* | 9/2019 | Wu | H04L 47/6275 |
| 2021/0297094 A1* | 9/2021 | Hamelin | H04L 1/0052 |

* cited by examiner

METHOD AND DEVICE FOR TRANSMITTING A MESSAGE

TECHNICAL FIELD

At least one embodiment relates to a method for transmitting a message from a first node device to a second node device belonging to a network neighbourhood of the first node device, said first and second node devices belonging to an electrical supply network using powerline communications. At least one embodiment relates to a device implementing the method.

PRIOR ART

Powerline communications (PLC) are developing, in particular in the context of electrical supply networks of the AMM (abbreviation signifying "Automated Meter Management") type. Communication networks are thus implemented in electrical supply networks for the automated collection, by a base node device (also called a "data concentrator") of the network, from smart electricity meters, of energy consumption reading data that said smart electricity meters are respectively responsible for monitoring.

The G3-PLC communication standard is defined to enable the various node devices (in particular the data concentrator and smart electricity meters) of such a network to communicate with each other. The standard is specified in the ITU-T recommendation G.9903, which describes in particular the physical layer (PHY) and the data link layer (DLL) of the OSI (the acronym for "Open Systems Interconnection") model. The G3-PLC standard is intended to be used in frequency bands ranging from 10 to 490 kHz. It supports more particularly the following frequency bands: the CENELEC A frequency band, which goes approximately from 35 kHz to 91 kHz; the FCC frequency band, which goes approximately from 150 kHz to 480 kHz; the ARIB frequency band, which goes approximately from 150 kHz to 400 kHz; and the CENELEC B frequency band, which goes approximately from 98 kHz to 122 kHz. These various frequency bands have different characteristics in terms of bit rate, range and resistance to interference, in particular.

However, the G3-PLC standard allows the use of only one frequency band for a given node device. More exactly, recent node devices may sometimes support a plurality of frequency bands, but not at the same time. Reconfiguration is then necessary to change from a first frequency band to a second frequency band. Thus, when in a communication network it is necessary to reconfigure, in a new frequency band, a set of data concentrator devices and a set of electricity meters that are associated therewith, a reconfiguration may prove to be particularly complex. For example, a meter device that has not been able to receive a message indicating to it to change frequency band may become incapable of communicating with the data concentrator device with which it is associated, after the latter, for its part, has been able to change frequency band.

However, the requirements in terms of resources of the communication networks, in particular in deploying electrical supply networks of the AMM type, are increasing from day to day. The frequency band for which the elements constituting a network have been certified may be at the limit of their capacity, which does not make it possible to increase the number of exchanges in the network, for example to introduce new functionalities, new application requirements, etc.

It is desirable to overcome these various drawbacks of the prior art. It is in particular desirable to propose a powerline communication method making it possible to increase the capacity of the number of exchanges in the network that is simple to implement. It is in particular desirable to propose a solution applicable to electrical supply networks of the AMM type.

DISCLOSURE OF THE INVENTION

A method for transmitting a message from a first node device to a second node device belonging to a network neighbourhood of said first node device is described. The first and second node devices belong to an electrical supply network using powerline communications. The method comprises the following steps implemented by the first node device:
- fragmenting said message into at least a first fragment and a second fragment;
- associating, with said first fragment, a first frequency band of a set of frequency bands comprising at least two frequency bands and associating, with said second fragment, a second frequency band of said set of frequency bands, said first and second frequency bands being different; and
- transmitting each of said first and second fragments on the frequency band with which it is associated.

The use of a plurality of frequency bands for sending a given message makes it possible to benefit from the characteristics of the various frequency bands in terms of bit rate, range and resistance to interference. Thus the transmission method described makes it possible to increase the capacity of many exchanges in the network.

In a particular embodiment, the frequency bands of said set of frequency bands are separate.

According to a particular embodiment, the message being fragmented into N fragments, N being a natural integer greater than or equal to 2, the first frequency band is associated with the odd fragments and the second frequency band is associated with the even fragments.

According to another particular embodiment, the next frequency band of said set of frequency bands available is associated with the next fragment to be transmitted.

According to a particular embodiment, said message is fragmented in accordance with the 6LowPAN protocol.

According to a particular embodiment, the set of frequency bands comprises:
- the CENELEC A frequency band;
- the CENELEC B frequency band; and
- the FCC frequency band or the ARIB frequency band.

A node device of an electrical supply network using powerline communications is also described. The node device is configured to communicate with another node device of said network belonging to its network neighbourhood.

It comprises:
- means for fragmenting a message into at least a first fragment and a second fragment;
- means for associating, with said first fragment, a first frequency band of a set of frequency bands comprising at least two frequency bands and for associating, with said second fragment, a second frequency band of said set of frequency bands, said first and second frequency bands being different;
- means for transmitting each of said first and second fragments on the frequency band with which it is associated.

A powerline communication network is described. The network comprises a plurality of node devices, said plurality of node devices comprising at least one node device according to the preceding embodiment, referred to as a multiband node device, which comprises, in its network neighbourhood, at least one node device comprising:

means for receiving each of said first and second fragments on the frequency band with which it is associated; and means for reassembling said first and second fragments to reconstruct said message.

According to a particular embodiment, a message that is to be transmitted in broadcast mode to a plurality of adjacent node devices is transmitted by said multiband node device on a single frequency band and a message that is to be transmitted in unicast mode to an adjacent node device is fragmented and transmitted by said multiband node device on a plurality of frequency bands in the case where said adjacent node device comprises means for reassembling said first and second fragments to reconstruct said message and is transmitted by said multiband node device on a single frequency band otherwise.

A computer program product is described. It comprises instructions for implementing, by a node device, the method according to one of the preceding claims, when said program is executed by a processor of the node device.

A storage medium is also described. It stores a computer program comprising instructions for implementing, by a node device, the method according to one of the preceding embodiments, when said program is executed by a processor of the node device.

BRIEF DESCRIPTION OF THE DRAWINGS

The features of the invention mentioned above, as well as others, will emerge more clearly from the reading of the following description of an example embodiment, said description being made in relation to the accompanying drawings, among which:

FIG. 2 illustrates schematically a message transmission method according to a particular embodiment;

DETAILED DISCLOSURE OF EMBODIMENTS

Figure 1:
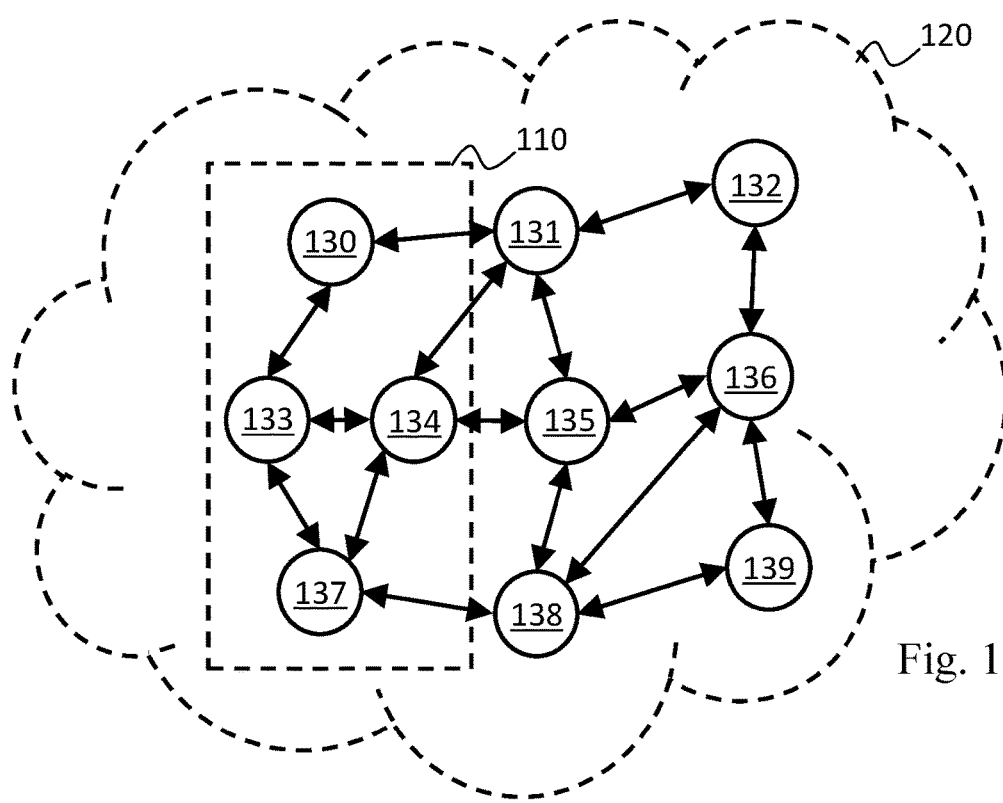
FIG. 1 illustrates schematically a mesh communication network according to one embodiment.

FIG. 1 illustrates schematically a mesh communication network 120. The mesh communication network 120 is for example an electrical supply network of the AMM type. The mesh communication network 120 relies on powerline communications PLC to enable a base node device (also called a "data concentrator") to collect, from smart electricity meters, energy consumption reading data from electrical installations that said smart electricity meters are respectively responsible for monitoring. The data concentrator and the smart electricity meters are thus node devices of the mesh communication network 120. The mesh communication network 120 may comprise other node devices, for example installed at electrical transformers. The communication network 120 therefore has a mesh structure, as shown schematically on FIG. 1 by means of arrows, where node devices fulfil the role of relays for increasing the range of the communications in the mesh communication network 120, as detailed hereinafter. Thus the same smart electricity meter has available potentially a plurality of paths for reaching the data concentrator, and vice-versa.

The present invention is thus particularly adapted to the context of the G3-PLC (registered trade mark) technology.

The mesh communication network 120 thus comprises a plurality of node devices 130, 131, 132, 133, 134, 135, 136, 137, 138, 139. A network neighbourhood is associated with each node device of the mesh communication network 120. On FIG. 1, the node device 133 is associated with a network neighbourhood 110 encompassing the node devices 130, 134 and 137. In the mesh communication network 120, a signal or a message broadcast by a node device (such as the node device 133) is in general not visible at every point in the communication network. Each node device sending signals or messages then has a network neighbourhood, that is to say a subset of said mesh communication network 120 wherein every node device can intelligibly receive said signals or messages directly coming from the node device that broadcast said signals or messages. The network neighbourhood corresponds to the range of the signals sent, according to predetermined transmission parameters (e.g. power, modulation and coding scheme, network topology, etc.) of the node device at the source of said signals and also potentially according to characteristics of the communication channel (attenuation, noise, impedance, etc.).

The mesh communication network 120 relies on a routing protocol of the reactive type, such as the LOADng protocol ("Lightweight On-demand Ad hoc Distance-vector Routing Protocol—Next Generation"). Unlike the routing protocols of the proactive type that rely on a global knowledge of the network topology, the routing protocols of the reactive type rely on on-demand route discoveries, each node device of the network then needing solely to have knowledge of its own network neighbourhood for routing data in the mesh communication network 120.

To discover a suitable route in the mesh communication network 120 from a source node device (for example the node device 133) as far as a destination node device (for example the node device 132), it is known that the source node device broadcasts a route discovery request, called RREQ ("Route REQuest"). This route discovery request is received by each node device in the network neighbourhood of said source node device. Each node device in the network neighbourhood of said source node device relays said request by broadcast if said node device in question is not the destination node device. By gradual broadcasting, a plurality of route discovery requests are typically received by the destination node device, each of these requests having followed a different path in the mesh communication network 120.

Each node device that originates a message, such as for example a route discovery request, includes therein an identifier that is particular to it, as well as a sequence number, as defined in the LOADng protocol. This sequence number is a counter value particular to each node device of the mesh communication network 120. Each time a node device generates a new message, said node device increments its counter and includes the value of said counter in the message in question. Thus, when a node device receives a message, said node device analyses the identifier of the node device originating the message and the sequence number that are included in the message, and can determine whether the message received is actually a new message or a new copy of a message already received.

Each node device can however decide not to relay a route discovery request, when one or more criteria are not met. In particular, before deciding to relay said request, the node device in question typically checks whether said request comprises information representing a route cost, from the source node device as far as the node device in question, that is better than the route cost represented by information contained in another route discovery request previously received by the node device in question. In other words, the node device in question relays said request by broadcasting if said request relates to a path that has followed, from the source node device as far as the node device in question, a pathway of lower cost than any other request previously received by the node device in question (and therefore for the same route discovery).

The cost of a route may be based on one or more metrics. For example, the route cost is a number of hops experienced by the request in question from the source node device. According to another example, the route cost is the result of a calculation that depends on the bandwidth of the links passed over, by the request in question, from the source node device. According to yet another example, the route cost is proportional to the latency experienced by the request in question from the source node device. Other metrics may be used to establish a route cost, i.e. a transit cost, from the source node device as far as the destination node device.

When a node device decides to relay, by broadcast, a route discovery request, the node device in question updates the route cost information contained in said request, so as to take into account the fact that said request has passed through the node device in question. Thus, according to such a principle, a plurality of route discovery requests typically arrive at the destination node device, each comprising information on the cost of the route that said request followed to be propagated from the source node device as far as the destination node device. The path followed by said route discovery request associated with the best route cost is then selected to enable the source node device to transmit data to the destination node device. To activate the route in question, the destination node device transmits a route discovery reply called RREP ("Route REPly"). This route discovery reply is transmitted gradually following the reverse path of the route discovery request that was associated with the best route cost. Each node device receiving the route discovery reply updates an internal routing table, at the data link layer DLL, in order to indicate therein that any subsequent message transmitted in unicast mode from the source node device in question to the destination node device in question must be transmitted or relayed to such and such a node device of its network neighbourhood. In the link layer, also called the MAC ("Medium Access Control") layer, the routing tables are preferentially implemented in an adaptation sublayer responsible for implementing the routing protocol in the communication network. For example, this adaptation sublayer is in accordance with the 6LoWPAN protocol (standing for "IPv6 over Low power Wireless Personal Area Networks), which was initially developed to support IPv6 in the context of the IEEE 802.15.4 standard and which was extended to the G3-PLC (registered trade mark) technology. It should be noted that the 6LoWPAN protocol is itself based on the routing protocol of the aforementioned LOADng reactive type.

By means of the routing tables thus configured, unicast communications can be made by any pair of node devices of the mesh communication network 120. Intermediate node devices therefore serve as relays when the node devices of said pair are not in the network neighbourhood of each other, and the communications thus take place gradually, each node device relying on one of its own neighbours to relay messages as far as their respective destinations.

To communicate between adjacent node devices (i.e. node devices that are in the network neighbourhood of each other), the messages are transmitted in the form of modulated frames. When a modulated frame is specifically addressed to an adjacent node device and is correctly demodulated by it, said adjacent node device retransmits an acknowledgement ACK to the node device that sent it said modulated frame. The acknowledgement ACK is transmitted on the same frequency band as the modulated frame with which said acknowledgement ACK is associated.

A plurality of frequency bands are defined for supporting the transmission of these modulated frames, an adapted modulation scheme being associated with each of these frequency bands. Each frame transmitted in the form of modulated signals begins with a preamble defined according to the modulation scheme according to which said signals were modulated. The preamble is adapted to make it possible to synchronise in reception on said frame, that is to say to be able to determine an actual instant of start of frame. To do this, the preamble typically comprises a plurality of successive copies of the same symbol. The actual content and the duration of the preamble are thus predefined and depend on the modulation scheme used. The preambles of a plurality of frames are identical when the same modulation scheme is applied, and different otherwise.

The modulation schemes applicable (and corresponding demodulation schemes) are preferentially multi-carrier modulation schemes (and respectively demodulation schemes) of the OFDM (Orthogonal Frequency Division Multiplex) type.

In terms of frequency bands that can be used in the context of the use of the mesh communication network 120, mention can be made of: the CENELEC A frequency band, which goes approximately from 35 kHz to 91 kHz; the FCC frequency band, which goes approximately from 150 kHz to 480 kHz; the ARIB frequency band, which goes approximately from 150 kHz to 400 kHz; and the CENELEC B frequency band, which goes approximately 98 kHz to 122 kHz. It is then possible to use: a first thirty-six carrier modulation scheme in the CENELEC A frequency band; a second seventy-two carrier modulation scheme in the FCC frequency band; a third fifty-four carrier modulation scheme in the ARIB frequency band; and a fourth sixteen carrier modulation scheme in the CENELEC B frequency band. It is clear from the above that a node device can simultaneously use a plurality of frequency bands for communicating with one or more of its neighbours, by applying an adapted transmission mechanism. However, it is clear that the ARIB and FCC frequency bands cannot be used simultaneously for the same node device since they overlap each other.

FIG. 2 illustrates schematically a method for transmitting a message according to a particular embodiment. A message M must be transmitted by a source node device (for example the node device 133) to a destination node device belonging to its network neighbourhood (for example the node device 134). This embodiment is described in particular in relation to the G3-PLC standard. However, it is not limited solely to this standard and could be applied to other standards, e.g. to the PRIME (standing for "PoweRline Intelligent Metering Evolution") specifications, i.e. in particular in a powerline communication network that does not have a mesh structure but has a tree structure.

The message starts with a step S200.

In a step S210, the message, which is for example encapsulated in an IP packet, e.g. an IPv6 packet (a packet with a size of up to 1400 bytes), is fragmented in at least two fragments in order to adapt it to the constraints of the MAC layer, in particular to the size of the MAC frames.

For this purpose, the G3-PLC standard incorporates the 6LoWPAN protocol, which makes it possible to adapt IPv6 data packets to the G3-PLC constraints, in particular by fragmenting them. This is because the MAC frames used by G3-PLC are of very much smaller sizes (400 bytes maximum available per packet for the IP part) than the IPv6 packets of 1400 bytes.

Figure 3:
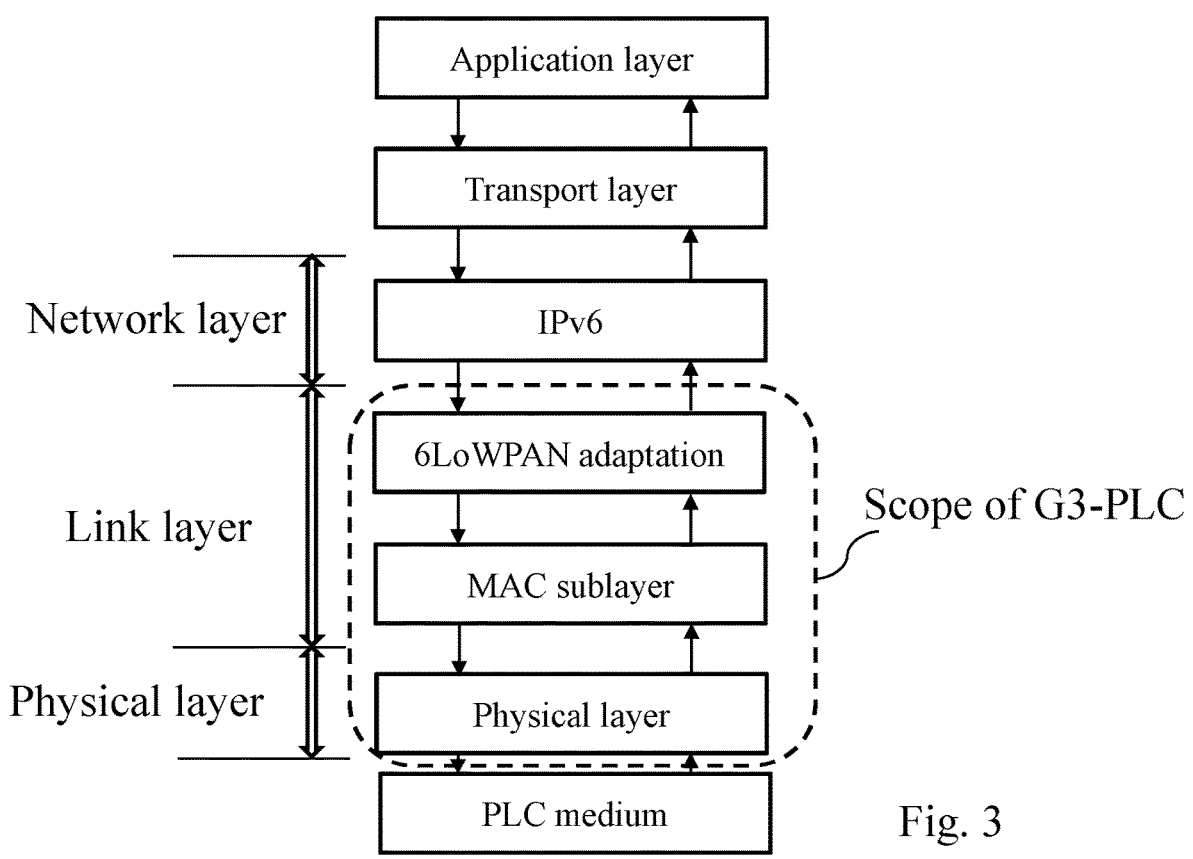
FIG. 3 illustrates schematically the various layers of an OSI model in the particular case of the G3-PLC standard.

The adaptation layer of 6LoWPAN is located between the network layer and the MAC sublayer of the OSI model as illustrated in FIG. 3. It receives from the network layer IPv6 packets of 1280 bytes and where applicable fragments them. Naturally, in the case of an IPv6 packet that is sufficiently small to be contained in a single G3-PLC MAC frame, no fragmentation is implemented. The method therefore applies to the case where the message is sufficiently long to have to be fragmented.

Each fragment is generally preceded by a fragmentation header, for example of 4 or 5 bytes.

Figure 4:
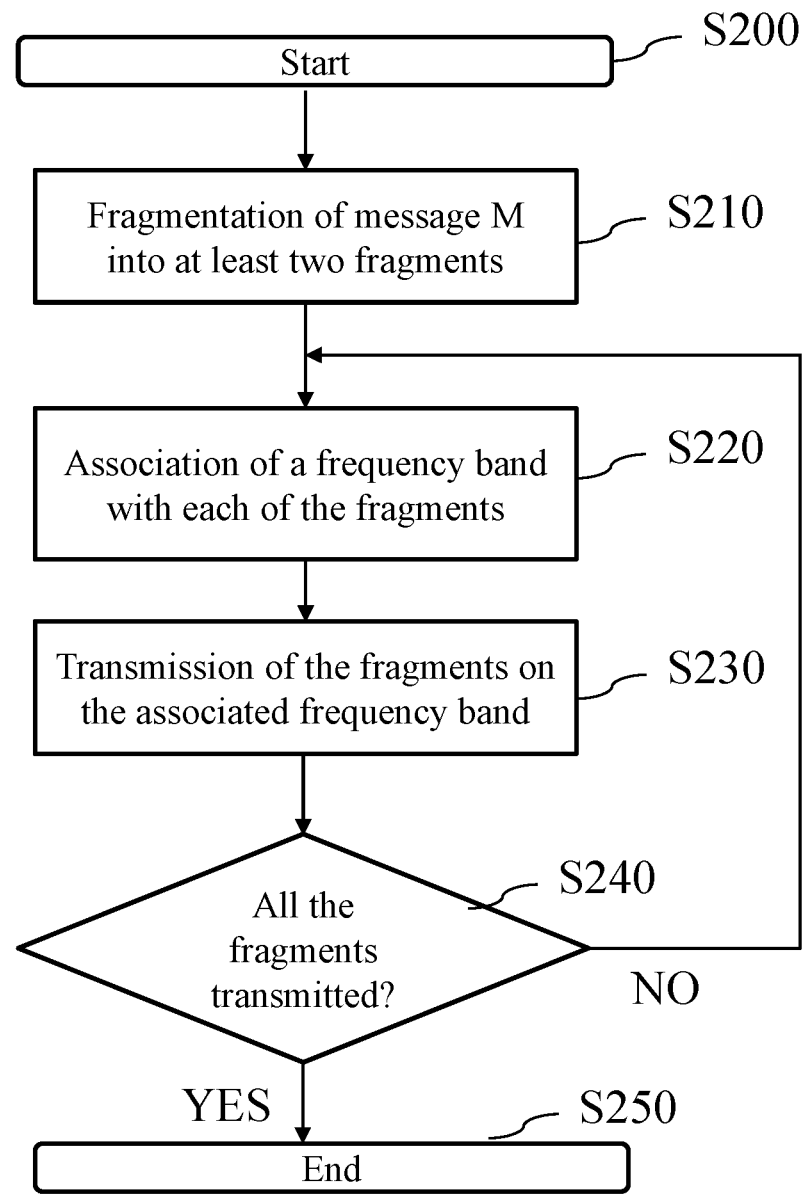
FIG. 4 illustrates schematically a header of a fragment according to the 6LoWPAN protocol.

This header contains for example the following information as illustrated by FIG. 4:
- 5 bits for identifying whether it is a fragment. The first fragment will have the value "11000" and the following ones "11100";
- 11 bits for indicating the size of the IP packet before fragmentation ("datagram_size" field);
- 16 bits for indicating an identifier ("datagram_tag" field) common to all the fragments of the same IP packet;
- 8 bits for indicating the position ("datagram_offset" field) of the fragment in the IP packet (solely present in the fragments following the first one).

The fragmentation is in particular described in section 5.3 of the RFC recommendation 4944 (published in September 2007).

In a step S220, a first frequency band is associated with a first fragment among said at least two fragments resulting from the fragmentation of the message M and a second frequency band different from the first frequency band is associated with the other one of said at least two fragments. The first and second associated frequency bands are for example selected from all the frequency bands authorised by G3-PLC, i.e. CENELEC A, CENELEC B, and ARIB or FCC. In a variant, the first and second associated frequency bands are selected from a subset of frequency bands authorised by G3-PLC, the subset comprising at least two bands from all the bands authorised by G3-PLC. Thus, according to the invention, fragments coming from the same IP packet can be associated with a view to transmission thereof at different frequency bands.

In a particular embodiment, the frequency bands are not only different but more particularly separate.

The embodiments described for two fragments may be extended in the case of more than two fragments, e.g. N fragments with N a natural integer. In this case, the same frequency band can be associated with different fragments. However, different frequency bands are associated with at least two fragments of the message M among the N fragments.

In a particular embodiment, the frequency bands are associated alternately with the fragments. For example, in the case of two frequency bands to be associated, the first frequency band is associated with the odd fragments (i.e. the fragments 1, 3, 5, etc.) and the second frequency band is associated with the even fragments (i.e. the fragments 2, 4, 6, etc.). In other words, two fragments which follow each other in the message are transmitted in different frequency bands.

In a variant embodiment, the first M fragments are associated with the first M frequency bands available, with M a natural integer less than N. A mechanism of the CSMA/CA type (the acronym for "carrier-sense multiple access with collision avoidance") makes it possible to determine whether a band is available. For example, M=3. As soon as an acknowledgement ACK is received via a frequency band, then the fragment that follows the first M fragments in the message M is transmitted on this frequency band and so on. In other words, a fragment to be sent is transmitted on the first frequency band available.

In a step S230, the fragment is transmitted on the frequency band that is associated therewith. Thus the various fragments can advantageously be transmitted in parallel on different frequency bands. The transmission of a fragment on the medium, i.e. on the current line, conventionally comprises various steps, in particular a separation of the fragments in order to adapt them to the physical layer and an OFDM modulation of the signal. The segmentation consists of partitioning an MAC (the acronym for "Media Access Control") frame into PSDUs (the acronym for "PHY Service Data Unit"). All the PSDUs coming from the same fragment are modulated using the same modulation scheme.

In a step S240, if all the fragments have been transmitted, then the method is ended (S250). Otherwise the method resumes at the step S220 with the next fragment to be transmitted.

Figure 5:
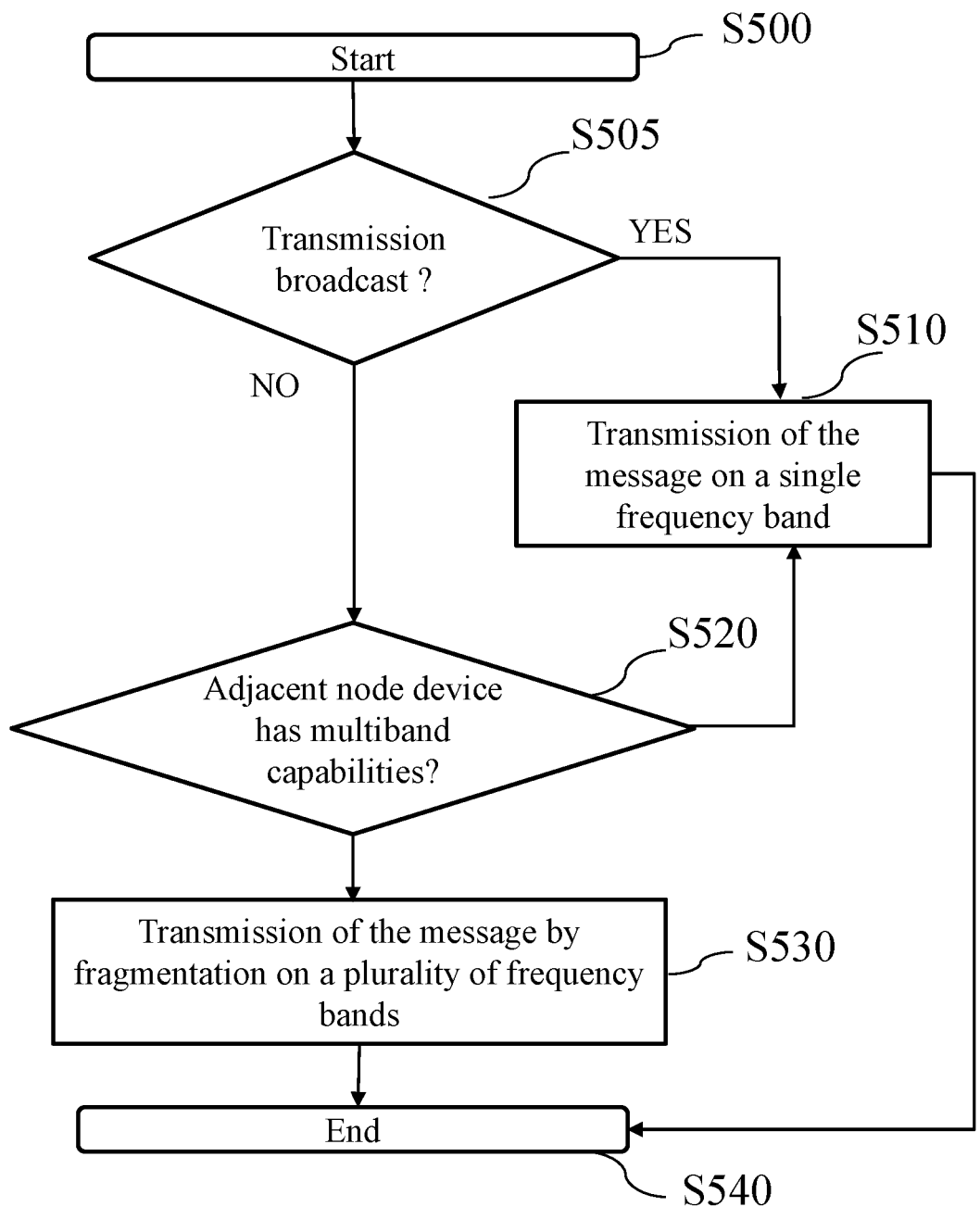
FIG. 5 illustrates schematically a message-transmission method according to a particular embodiment.

FIG. 5 illustrates schematically a method for transmitting a message according to a particular embodiment. The method of FIG. 5 uses in particular the method described in relation to FIG. 2. A message M must be transmitted by a source node device (for example the node device 133) to one or more destination adjacent node devices in broadcast mode or in unicast mode. By way of example, the discovery messages for a route in the communication network are generally transmitted in broadcast mode. Once the route has been defined, the subsequent messages are sent in unicast mode.

The method starts in a step S500.

In a step S505, the source node device checks whether the transmission of the message is a broadcasting of the message to a plurality of adjacent node devices or a transmission of the message in unicast mode to a single adjacent node device. If the message is broadcast, then the method continues to a step S510, otherwise it continues to a step S520.

In the step S510, the source node device broadcasts the message to the plurality of adjacent node devices using a single frequency band (the monoband case). This frequency band is the one supported by all the node devices of the network.

During the step S520, the source node device determines whether the node device that is the destination of the message has multiband capabilities, i.e. whether it is configured to receive a message on a plurality of frequency bands or whether it has only monoband capabilities, i.e. if it is configured to receive a message on only one frequency band. If such is the case, then the method continues to a step S530, otherwise the method continues to the step S510. In one example embodiment, an exchange of messages according to a predefined protocol enables, for example, the source node device to obtain information with regard to the communication capabilities of an adjacent node device. For example, the source node device sends to the adjacent node device an example of a first message in each of the frequency bands in which it can communicate because of its configuration, and the adjacent node device is configured to recognise such a message and to respond thereto by a second message in each of the frequency bands in which it has been able to receive it.

In a G3-PLC context for example, the examples of the first message contain information according to which a channel estimation is sought from the adjacent node device, for the frequency band in which it received the message (so-called "Tone Map") request. Advantageously, the information according to which a channel estimation is sought from the adjacent node device by the source node device is then a Tone Map Request indicator of a frame check header defined according to the ITU-T recommendation G9903. Thus the adjacent node device will respond to the Tone Map Request by sending to the source node device, in each of the frequency bands in which it receives an example of the first message, a second message comprising information representing at least one channel estimation in the form of a Tone Map Response data block as defined according to the ITU-T recommendation G9903. The source device will therefore be able to know and store information with regard to the frequency bands that it can use for communicating with the adjacent node device.

Other methods may be used.

In the step S530, the source node device transmits the message to the destination node device by applying the method described in relation to FIG. 2.

The method ends in a step S540.

Figure 6:
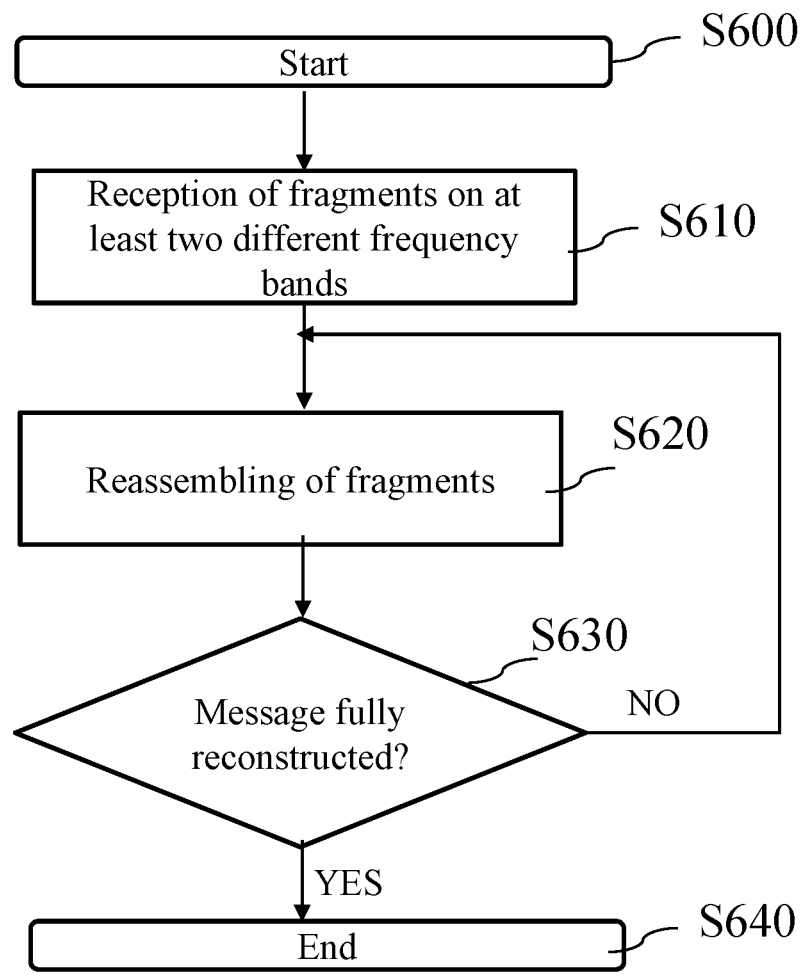
FIG. 6 illustrates schematically a message-reception method according to a particular embodiment.

FIG. 6 illustrates schematically a method for receiving a message according to a particular embodiment. A message M transmitted by a source node device (for example the node device 133) is received by a node device belonging to its network neighbourhood (for example the node device 134).

This embodiment is described in particular in relation to the G3-PLC standard. However, it is not limited solely to this standard and could be applied to other standards, e.g. the prime specifications.

The method starts at a step S600.

In a step S610, the destination node device receives fragments sent by the source node device. This step of receiving a fragment on the medium, i.e. on the current line, conventionally comprises various steps, in particular an OFDM demodulation of the signal and a reassembly of the PSDUs in order to reconstruct the MAC frames. These processes are the reverse processes of the segmentation and modulation processes implemented by the source node device during the step S230. The various fragments may be received in any order.

In a step S620, the destination node device begins to reconstruct the original message, the size of which is indicated in the datagram_size field. For this purpose, the destination node device uses the datagram_offset field in order to determine the position of the various fragments in the original message, e.g. in the IP packet. For example, it can place in a dedicated buffer, referred to as a reassembly buffer, the data payload, i.e. without the headers, at the position indicated by the datagram_offset field. The size of the reassembly buffer is determined from the datagram_size field.

If all the fragments are received and therefore the message fully reconstructed, the method ends (S640). If not all the fragments are yet received, the method continues to the step S610 until the all fragments forming the message M have been received. According to a particular embodiment, the destination node device, when it receives a first fragment of the message M, triggers a time counter. If not all the fragments of the message M are received when the counter reaches a predefined threshold value, e.g. 60 seconds, then the fragments received are ignored.

Figure 7:
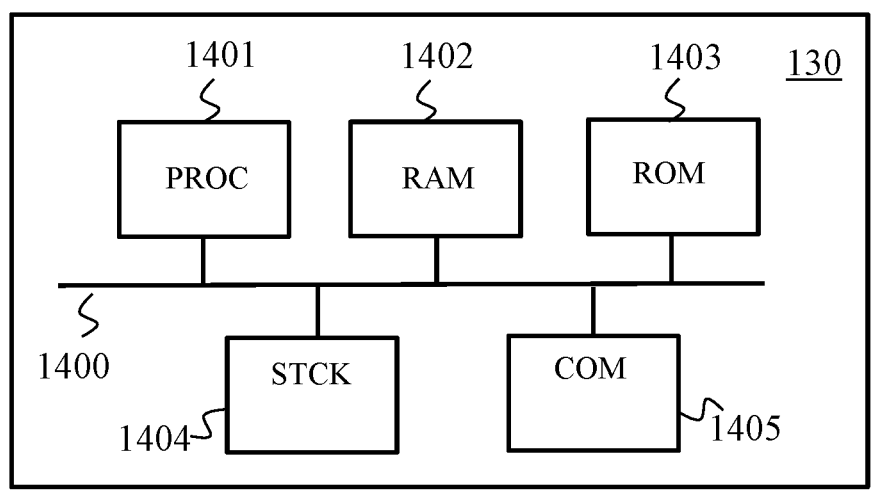
FIG. 7 illustrates schematically an example of hardware architecture of a node device of the mesh communication network according to one embodiment.

FIG. 7 illustrates schematically an example of hardware architecture of a node device 130 of the mesh communication network 120 according to one embodiment. Such a node device is termed multiband since it is capable of transmitting a message on a plurality of frequency bands. It should be noted that FIG. 7 could also illustrate schematically an example of hardware architecture of a processing module included in the node device.

According to the example of hardware architecture shown in FIG. 7, the node device 130 then comprises, connected by a communication bus 1400: a processor or CPU (Central Processing Unit) 1401; a random access memory RAM 1402; a read only memory ROM 1403; a storage unit such as a hard disk (or a storage medium reader, such as an SD ("Secure Digital") card reader 1404; at least one communication interface 1405 enabling the node device 130 to communicate with the node devices belonging to its network neighbourhood, e.g. the node devices 131 and 133.

The processor 1401 is capable of executing instructions loaded in the RAM 1402 from the ROM 1403, from an external memory (not shown), from a storage medium (such as an SD card), or from a communication network. When the node device is powered up, the processor 1401 is capable of reading instructions from the RAM 1402 and executing them. These instructions form a computer program causing the implementation, by the processor 1401, of all or some of the methods described in relation to FIGS. 2, 5 and 6.

The methods described in relation to FIGS. 2, 5 and 6 can be implemented in software form by executing a set of instructions by a programmable machine, for example a DSP (digital signal processor) or a microcontroller, or be implemented in hardware form by a machine or a dedicated component, for example an FPGA (Field-Programmable Gate Array) or an ASIC (Application-Specific Integrated Circuit). In general, the node device 130 comprises electronic circuitry configured to implement the methods described in relation to FIGS. 2, 5 and 6.

The invention claimed is:

1. A transmission method for transmitting a message from a first node device to a second node device belonging to a network neighbourhood of said first node device, said first and second node devices belong to an electrical supply network using powerline communications, the transmission method comprising, implemented by the first node device:
fragmenting said message into N fragments, N being a natural integer greater than or equal to 2;
associating, with the odd fragments, a first frequency band of a set of frequency bands comprising at least two frequency bands and associating, with the even fragments, a second frequency band of said set of frequency bands, said first and second frequency bands being different; and
transmitting said odd fragments on the first frequency band and said even fragments on the second frequency band in response to the odd and even fragments being associated with the first and second frequency bands, respectively, so that the odd and even fragments are transmitted on different frequency bands,
wherein the transmission method further comprises the following step performed by said second node device:
- receiving each of the N fragments on the frequency band with which is associated with each respective said N fragments; and
- reassembling said N fragments to reconstruct said message.

2. The method according to claim 1, wherein said message is fragmented in accordance with a 6LowPAN protocol.

3. The method according to claim 1, wherein said set of frequency bands comprises:
- a CENELEC A frequency band;
- a CENELEC B frequency band; and
- an FCC frequency band or an ARIB frequency band.

4. A non-transitory storage medium storing instructions for implementing, by a node device, the method according to claim 1, when said instructions are executed by a processor of the node device.

5. An electrical supply network using powerline communications and comprising a first node device being configured to transmit a message to a second node device of said network belonging to a network neighbourhood thereto, said first node device comprising:
- means for fragmenting said message into N fragments, N being a natural integer greater than or equal to 2;
- means for associating, with the odd fragments, a first frequency band of a set of frequency bands comprising at least two frequency bands and for associating, with the even fragments, a second frequency band of said set of frequency bands, said first and second frequency bands being different; and
- means for transmitting said odd fragments on the first frequency band and said even fragments on the second frequency band in response to the odd and even fragments being associated with the first and second frequency bands, respectively, so that the odd and even fragments are tranmitted on different frequency band; and said second node device comprising at least one processor configured to,
- receive each of said odd and even fragments on the first and second frequency bands, respectively; and
- reassemble said first and second fragments to reconstruct said message.

6. The electrical supply network according to claim 5, wherein a message that is to be transmitted in broadcast mode to a plurality of adjacent node devices is transmitted by said node device according to claim 5 on a single frequency band and a message that is to be transmitted in unicast mode to an adjacent node device is fragmented and transmitted by said node device according to claim 5 on a plurality of frequency bands in the case where said adjacent node device comprises means for reassembling said first and second fragments to reconstruct said message and is transmitted by said node device according to claim 5 on a single frequency band otherwise.

7. A transmission method for transmitting a message from a first node device to a second node device belonging to a network neighbourhood of said first node device, said first and second node devices belong to an electrical supply network using powerline communications, the transmission method comprising, implemented by the first node device:
- fragmenting said message into N fragments, N being a natural integer greater than or equal to 2;
- associating, with the odd fragments, a first frequency band of a set of frequency bands comprising at least two frequency bands and associating, with the even fragments, a second frequency band of said set of frequency bands, said first and second frequency bands being different; and
- transmitting, in parallel, said odd fragments on the first frequency band and said even fragments on the second frequency band in response to the odd and even fragments being associated with the first and second frequency bands, respectively, so that the odd and even fragments are transmitted in parallel on different frequency bands, wherein a message that is to be transmitted in broadcast mode to a plurality of adjacent node devices is transmitted by said first node device on a single frequency band and a message that is to be transmitted in unicast mode to an adjacent node device is fragmented and transmitted by said first node device on a plurality of frequency bands in the case where said adjacent node device comprises means for reassembling said odd and even fragments to reconstruct said message and is transmitted by said first node device on a single frequency band otherwise.

* * * * *